United States Patent

Kerhan

[15] 3,659,404
[45] May 2, 1972

[54] SUGAR CANE HARVESTERS
[72] Inventor: Roberto Henderson Kerhan, 309 10th Street, Marianao, Cuba
[22] Filed: Nov. 25, 1970
[21] Appl. No.: 92,794

[30] Foreign Application Priority Data
    Dec. 13, 1969 Cuba..................................210717

[52] U.S. Cl..................................................56/13.9, 56/315
[51] Int. Cl. ........................................................A01d 45/02
[58] Field of Search .......................56/13.6, 13.7, 13.8, 13.9, 56/14.3, 60, 61, 315, 328, 330, 11.2

[56] References Cited

UNITED STATES PATENTS

| | | | |
|---|---|---|---|
| 3,325,982 | 6/1967 | Fogels et al. | 56/11.2 |
| 3,419,896 | 12/1968 | Duncan | 56/13.7 X |
| 3,439,481 | 4/1969 | Hall | 56/328 R |
| 2,724,228 | 11/1955 | Duncan | 56/13.7 |
| 3,397,520 | 8/1968 | Johnston et al. | 56/14.3 |
| 1,232,681 | 7/1917 | Harmsen | 56/315 |
| 3,550,361 | 12/1970 | Faxas | 56/13.7 |

Primary Examiner—Russell R. Kinsey
Attorney—Robert G. McMorrow

[57] ABSTRACT

A sugar cane harvester for mounting on a prime mover and for actuation thereby wherein a supporting frame has a forward structure to position the cane for cutting and has a vertically actuated side knife to demarcate a line of cut. Rotary horizontal blades sever the cane at its base, and drum mounted cross blades cut the severed cane into appropriate lengths and deposit the same on a conveyor system.

3 Claims, 4 Drawing Figures

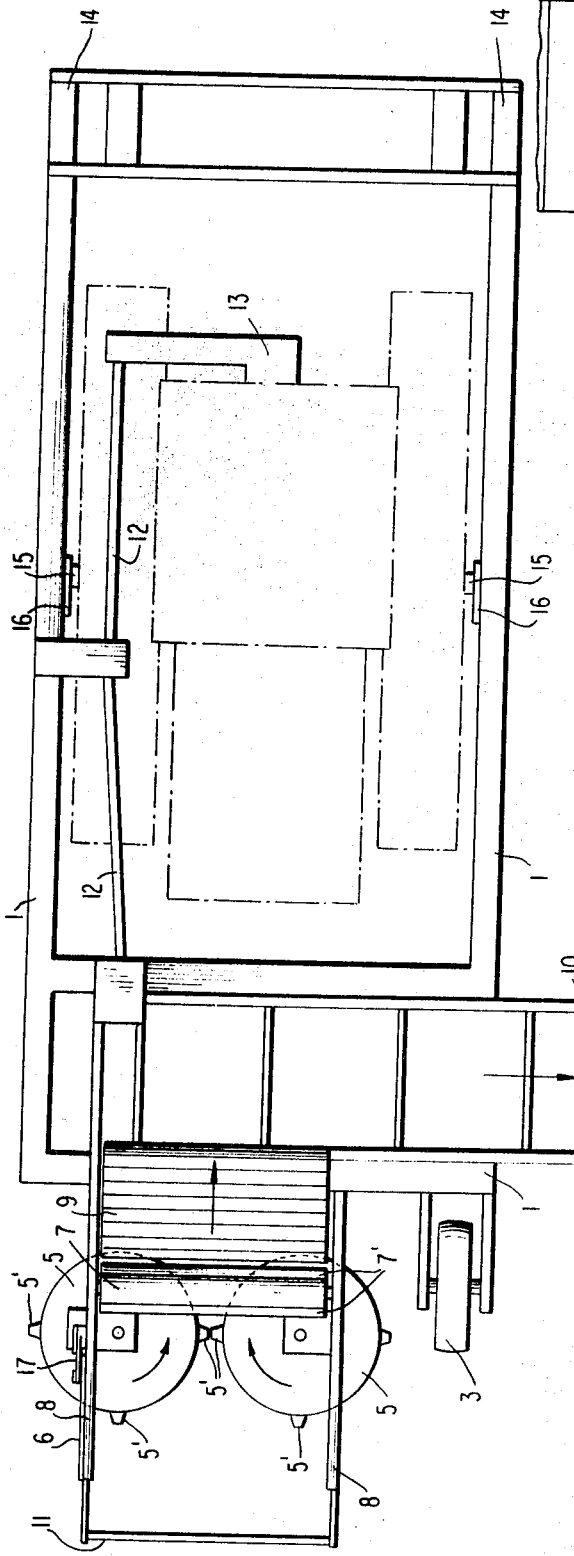
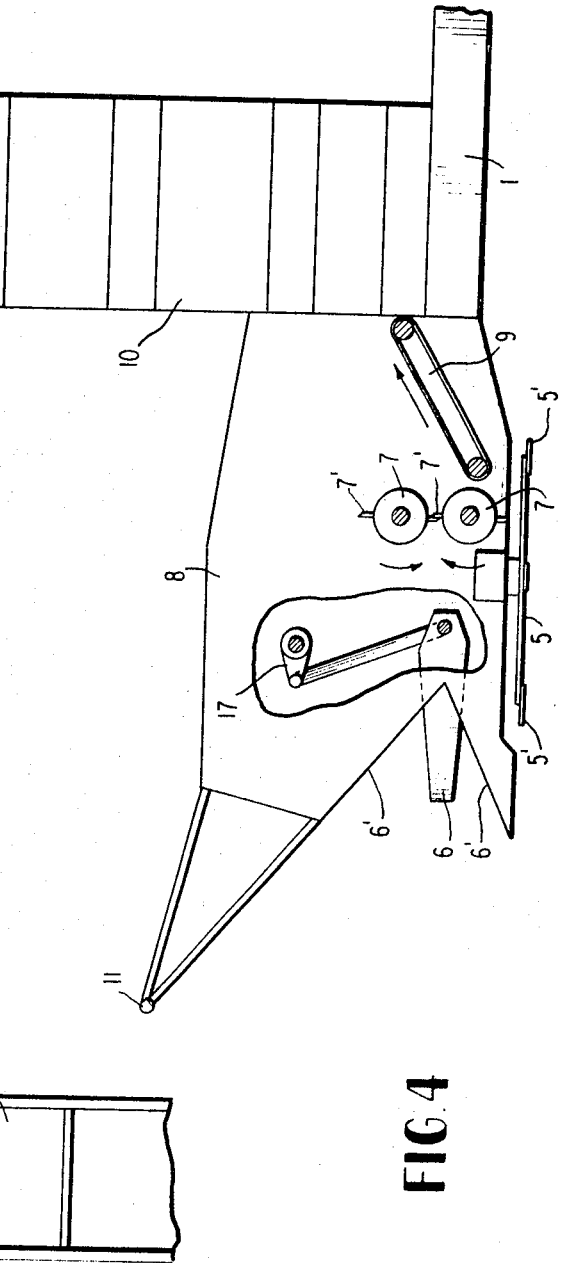
FIG. 2
FIG. 4
INVENTOR
ROBERTO HENDERSON KERHAN
ATTORNEY

SUGAR CANE HARVESTERS

BACKGROUND OF THE INVENTION

1. Field of the Invention

This invention pertains to harvesting devices for sugar cane and the like.

2. Statement of the Prior Art

It is known that there exist several types of sugar cane harvesters which are quite complicated and, therefore, very liable to breakdowns or stoppages, especially when used in densely populated sugar cane fields with a high trash content and very thick cane stalks, all of which prevents them from giving a high yield. Such inconveniences are avoided by the improvements introduced by the undersigned on this type of machine.

It is also known that when great quantities of cane have to be ground, especially in the case of sugar cane fields with a high productivity rate per surface unit and which, as it is only logical, are densely populated with very thick cane stalks, or where the cane is inclined or fallen and, on the other hand, there is a shortage of manpower, it is essential to have a type of harvester capable of giving good performance with a minimum of breakdowns and interruptions. This aim can only be attained by means of such a solid and simple machine as the one described herein.

SUMMARY OF THE INVENTION

The main object of this invention is to provide a sugar cane harvester whose only feeding means are constituted by its advancing or penetrating movement in the cane field and by the knives cutting the cane at ground level combined with other knives cutting the cane into small pieces. This would avoid the necessity of other special feeding devices such as conveyors, drums, chains, rollers, spirals, etc., as is the case with the harvesters known at present. Such an arrangement allows the construction of a much simpler and durable machine and, therefore, one with a high productivity rate per unit of time, as it is subject to a minimum of breakdowns and obstructions.

This characteristic is such that according to what we have been able to prove practically, this machine can harvest up to 100 tons of cane in one hour of operation.

Another purpose of this invention is the utilization of an existing type of tractor, preferably a track-type, to which the cane-cutting elements are coupled and which unload the cane onto the transporting means in order to carry it out of the cane field.

Another purpose of this invention is to provide a knife acting in a scissors-like manner which cuts the dividing line in the cane row, and another knife that cuts the cane at ground level and which helps in feeding a third knife that lifts the cane at a given moment of its rotation and chops it into small pieces, unloading it onto a conveyor which, in its turn, drops the cane on an elevating-conveyor forming a right angle with the first conveyor. The cane is unloaded by the elevating-conveyor on the transportation means that carries it out of the field.

It is also the aim of this invention to provide an easily adaptable mechanism which may be attached to the front section of the tractor, preferably a track-type, as well as to devise the means that would use the tractor power for the operation of such a mechanism.

Another purpose of this invention is to provide a front wheel, actuated by a hydraulic cylinder, for the purpose of regulating the cutting-height of the cane.

This invention provides a machine that harvests the cane totally, that is, including trash, leaves and tops. Such impurities would be separated before entering the mill by means devised to that effect. But, as previously stated, this would be counteracted by the fact that such machine allows the harvesting of a high tonnage of cane per unit of time. At the same time the breakdowns and interruptions which are so frequently encountered in harvesters known at present are avoided, for these machines require a much more complicated, and therefore, more fragile mechanism in order to accomplish a more complete operation.

Other advantages and characteristics of this invention will be easily appreciated by experts on the matter, according to the following description, with the help of the drawings included, in which similar reference characters designate similar parts.

BRIEF DESCRIPTION OF THE DRAWINGS

FIG. 2 is a top plan view thereof, with a portion of the conveyor partially broken away;

FIG. 3 is a front view in elevation; and

FIG. 4 is a side elevational view on enlarged scale of a portion of the front of the device, partially broken away for disclosure of details.

DESCRIPTION OF A PREFERRED EMBODIMENT

Figure 1:
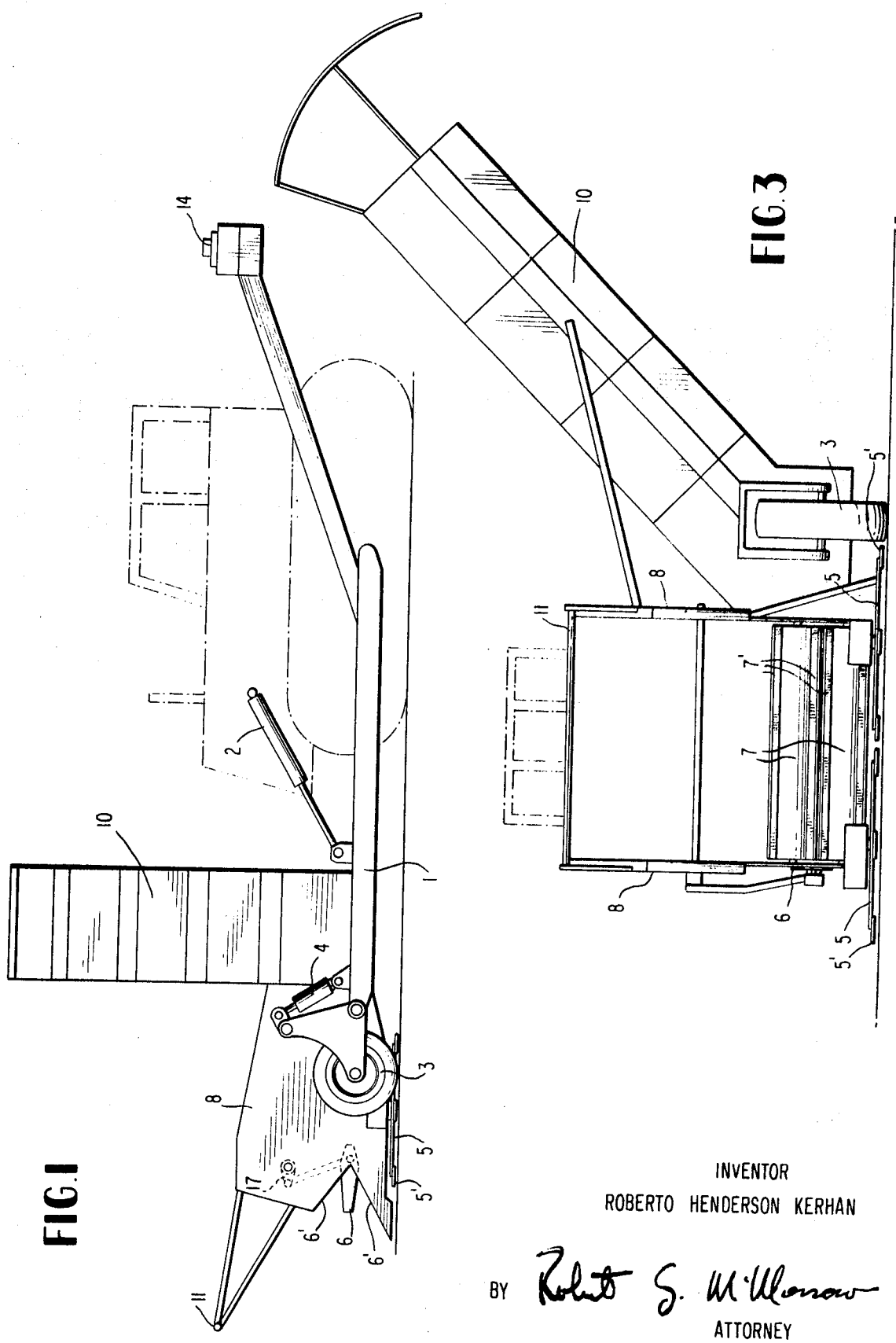
FIG. 1 is a side elevational view of the harvester, showing the prime mover in phantom lines.

This machine comprises a supporting structure 1 located on the lower portion which runs around a tractor (preferably a track-type), shown in the drawings by dotted lines. The supporting structure is mounted on the tractor by means of two pivoting shafts 15 and two bearings 16, FIG. 2, which allow the necessary movement to its front head by means of two hydraulic cylinders 2 (which also cooperate to maintain the structure in position). The machine comprises also a wheel 3 on its left front corner, which is actuated by another hydraulic cylinder 4; this wheel controls the level of the cane cut. The machine also comprises a counterweight 14 on it rear head which counterbalances the front section where the cane cutting and unloading machanisms are mounted.

The knife assembly that cuts the cane at ground level is made up of two identical disks 5 placed in horizontal position on the lower front section of the machine. The disks 5 are provided with cutting elements 5' on their edges suitably spaced, which rotate in opposite directions so that they not only cut the cane but also push it toward another knife assembly, shown in FIG. 4, which is situated on the top and towards the rear of knife assembly 5, 5'.

This second knife assembly cuts the cane into short lengths or "pieces" about 30 cms. long, and comprises two identical cylinders 7 located one on top of the other, in a horizontal position along the whole front of the machine. These cylinders rotate in opposite direction with cutting elements 7' suitably spaced over their whole length.

Behind cylinders 7 there is an upward slanted conveyor 9 which receives the pieces of cane cut by knife assembly 7, 7'. This conveyor drops the cut cane onto an elevating conveyor 10 which runs perpendicularly to conveyor 9 projecting itself upward and outward on one side of the machine so as to unload the cane pieces on the transportation means used to carry the cane out of the field.

Knife assembly 7, 7' and conveyor 9 are enclosed between two walls 8, FIGS. 2 and 3, which are fixed and protrude forwardly from the fore part of the supporting structure 1. These walls serve as guides for the cane, supporting on their top front extremes a horizontal bar 11. When the machine enters the cane field, the horizontal bar forces the top of the cane plants to tilt forward slightly, helping in this way to facilitate the cutting of the cane at its base.

This machine also has a knife that produces a vertical cut to mark the dividing line as it enters the cane field. Such knife is formed by an elongated flat piece 6 placed on the lower front portion of the left side wall 8, being fixed on this wall by its rear end. This arrangement allows the knife to move up and down by means of an eccentric 17. The knife has upper and lower sharp edges so that they can operate in a scissors-like manner during each stroke. The other cutting element is constituted by the sharp edges 6' of an angular cut made in the above mentioned wall 8. The vertex of this angular cut is very near to the pivotal mounting point of part 6. The different mechanisms of this machine are driven by the power take-off of the tractor on which they are mounted, by means of linkage 12, transmission 13 and any other part required for the purpose.

In operation, upon the entering of the harvester into the cane field the first element to come in contact with the cane is bar 11 placed at the upper front section of the machine. This bar tilts the cane slightly forward at the upper part. Thereupon, side knife 6 vertically cuts such canes as are actually out of range of the harvesters's action, thus marking the machine's dividing line. Lower knife assembly 5, 5' cuts the cane at the base thereof flush with the ground level, simultaneously impelling the cane towards knife assembly 7, 7'. This knife lifts the cane as a result of the action of cutting element 7' of the lower cylinder 7 which in every instance passes over knife 5. Besides, in cooperation with another of the cutting elements 7' of the upper cylinder 7 which rotate in opposite direction, with synchronized movement, the cane is gripped and attracted towards it by the said knife assembly 7, 7' cutting the cane into short lengths (pieces) preferably 30 cms. long.

As may be seen, this machine is fed only by the combination of its forward motion and the action of knife assemblies 5, 5' and 7, 7' without requiring any other special means for the feeding thereof, as it so happens in the case of other machines so far known. Once the cane passes knife assembly 7, 7', which, as already explained, the cane is cut thereby into small pieces, such pieces fall onto conveyor 9 which, in turn, carries the cane to the other elevating conveyor 10 which carries it out of the machine and unloads it onto the transportation means used for such purpose.

From the foregoing, it is evident that the function of this machine involves traversing a sugar cane field; cutting the cane stalks at the base thereof; chopping the cane into small pieces carrying out such pieces therefrom and then unloading them onto the transportation means used for their transportation to place of destination.

I claim:

1. An improved harvester for sugar cane for use with a prime mover having power take off means, the harvester comprising:

a supporting structure extending about the prime mover and including a structure front section, side sections and an aft section, the side sections being secured to the prime mover on pivoted shafts;

extensible and retractable cylinder means connected to the prime mover and to the supporting structure to pivot the supporting structure relative to the prime mover about said pivot shafts;

a pair of oppositely rotating knife assemblies mounted on said front section to sever the cane at its base adjacent ground level, the knife assemblies each comprising a rotating disk having radial cutting elements;

a second side mounted knife assembly operating vertically in scissors fashion on one side of the supporting structure at the front section thereof;

a third knife assembly on said supporting structure arranged to engage the cane after severance by the pair of oppositely rotating knife assemblies and to cut the severed cane into short lengths, said third knife assembly comprising a pair of horizontally disposed, oppositely rotating cylinders arranged in closely spaced and substantially parallel relation to one another, each said cylinder having a plurality of radially disposed cutting elements thereon;

a series of conveyors mounted on said structure to receive the cane after severance and cutting;

means linking the respective knife assemblies with the prime mover power take off; and a counter weight on the aft section of the supporting structure to counter balance the weight of the forward mounted knife assemblies.

2. The invention of claim 1, and:
a wheel on the forward section to control the adjustment of the level of cut.

3. The invention of claim 2, wherein:
the front section includes opposite side walls which extend forwardly; and
horizontal bar extending between the side walls to incline the cane forward and facilitate cutting.

* * * * *